(12) United States Patent
Bauer

(10) Patent No.: US 7,754,079 B2
(45) Date of Patent: Jul. 13, 2010

(54) PLANT-BASED SEWAGE TREATMENT SYSTEM FOR PURIFYING WASTEWATER

(75) Inventor: Hartmut Bauer, Fußgöheim (DE)

(73) Assignee: Deere & Company, Moline, IL (US)

( * ) Notice: Subject to any disclaimer, the term of this patent is extended or adjusted under 35 U.S.C. 154(b) by 352 days.

(21) Appl. No.: 11/579,473

(22) PCT Filed: Nov. 25, 2004

(86) PCT No.: PCT/EP2004/053100

§ 371 (c)(1),
(2), (4) Date: May 21, 2008

(87) PCT Pub. No.: WO2005/115931

PCT Pub. Date: Dec. 8, 2005

(65) Prior Publication Data

US 2008/0245714 A1    Oct. 9, 2008

(30) Foreign Application Priority Data

May 7, 2004    (DE) .................. 10 2004 023 170

(51) Int. Cl.
C02F 3/32    (2006.01)

(52) U.S. Cl. ...................... 210/602; 210/153

(58) Field of Classification Search .......... 210/602, 210/620, 153
See application file for complete search history.

(56) References Cited

U.S. PATENT DOCUMENTS

| | | | |
|---|---|---|---|
| 2008/0197073 A1* | 8/2008 | Jacquet | 210/602 |
| 2009/0001002 A1* | 1/2009 | Bauer et al. | 210/138 |

FOREIGN PATENT DOCUMENTS

| | | | | |
|---|---|---|---|---|
| CN | 1269331 | A | * | 10/2000 |
| DE | 4339905 | C1 | * | 11/1994 |
| DE | 196 30 830 | | | 2/1998 |
| DE | 196 30 831 | | | 2/1998 |
| DE | 1963083 | A1 | * | 2/1998 |
| DE | 197 50 276 | | | 5/1999 |
| GB | 2375761 | A | * | 11/2002 |
| GB | 2 375 761 | | | 6/2004 |

* cited by examiner

Primary Examiner—Fred Prince

(57) ABSTRACT

The invention relates to a plant-based sewage treatment system for purifying waste water including at least one planter, a supply unit which supplies waste water to be purified to the plant-based sewage treatment system, a discharge unit for discharging purified water from the plant-based sewage treatment system, and plants placed inside the planter. The plants are arranged, without a substrate, inside the planter. At least a portion of the planter is situated on a building roof. A space is provided between the planter and the building roof and an exchange medium from the building can be flowed through the space.

21 Claims, 6 Drawing Sheets

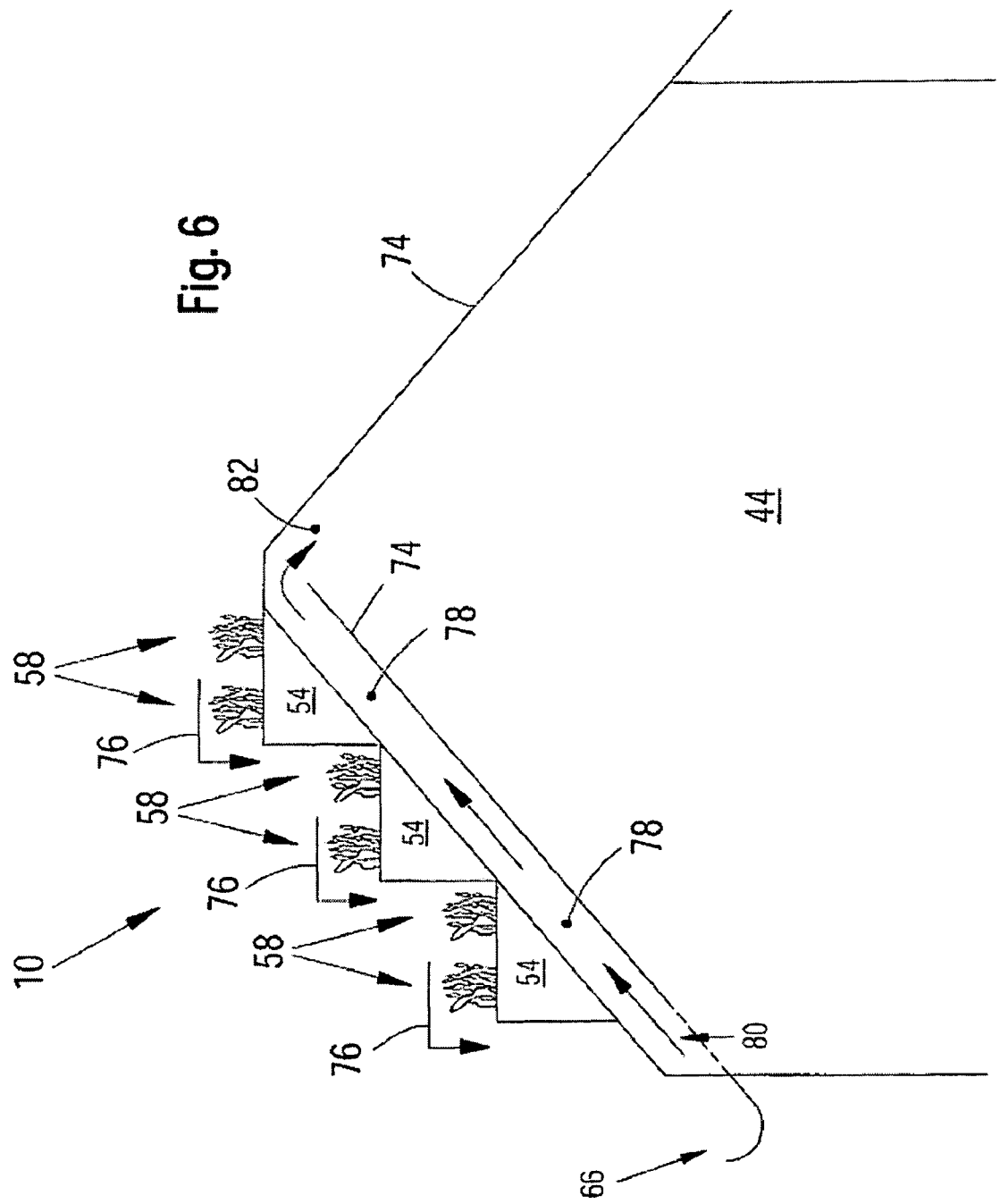

PLANT-BASED SEWAGE TREATMENT SYSTEM FOR PURIFYING WASTEWATER

FIELD OF THE INVENTION

The present invention relates to a plant based sewage treatment system for purification of wastewater.

BACKGROUND OF THE INVENTION

Various production related wastewaters arise in many industrial concerns. Normally wastewater is purified in sewage treatment plants by technical processes. The so called nearly natural methods have been used for some time as an alternative to traditional sewage treatment plants for the purification of smaller wastewater streams or amounts of wastewater. When nearly natural methods are used, the self cleaning mechanisms of nature are utilized and, moreover, new wet biotopes and green spaces are created. In addition, such nearly natural methods are associated with considerable cost savings.

Plant based sewage treatment systems, as are already in use in many places, are among these nearly natural methods. A plant based sewage treatment system is based on a biological symbiosis between specially grown water plants and microorganisms, for example bacteria, fungi and algae.

Current plant based sewage treatment systems are mainly operated by private households and communes and are mostly used where connection to a central sewage treatment system is too costly. In these systems plants are planted on soil, gravel or sand (i.e., in a substrate). However, the plant based sewage treatment systems usually require relatively large areas, which are mostly not available, especially in industrial regions. Merely as a matter of example, reference is made to DE 196 30 831 C2, which concerns a plant based sewage treatment system.

SUMMARY

Accordingly, an object of this invention is to provide a plant based sewage treatment system which does not require a relatively large area.

This and other objects are achieved by the present invention, wherein a plant based sewage treatment system for purification of wastewater can be operated with lower space requirement, preferably in a private field and/or in industrial concerns. Accordingly, the plant based sewage treatment system in accordance with the invention for purification of wastewater consists of at least one plant container, a feed unit with which the wastewater that is to be purified can be fed to the plant based sewage treatment system, and a discharge unit with which the purified water can be discharged from the plant based sewage treatment system. Plants are arranged in the plant container. Preferably, the plant container is at least mostly open at the top. The plants are developed so that they are situated in the plant container without a substrate. At least a part of the plant container is situated on a building roof. In accordance with the invention an intermediate space is provided at least over some area between the plant container and the building roof through which air or an exchange medium from the building can be conducted.

In accordance with the invention it was initially recognized that, in an already existing industrial concern, industrial region or residential region, new areas for sediments for a plant based sewage treatment system need not be created if the plant based sewage treatment system is installed on a building roof, for example on the roof of a production building of an industrial concern. The plant based sewage treatment system in this case could be designed so that it can be installed on the flat roof of a building, in particular an existing industrial building. In the case of an existing industrial building care should be taken that the permissible roof load of such a production building is not exceeded by the plant based sewage treatment system. This is especially possible when the substrate in which the plants of the plant based sewage treatment system are usually situated can be omitted. This is why the plants of the plant based sewage treatment system were chosen so that industrial and/or sanitary wastewater can be purified without the usual substrate or sediment, so that the roofs can be used without special operations to improve load bearing capacity.

Thus, the plant based sewage treatment system in accordance with the invention, through the omission of the usual substrate, not only can be made smaller and require less surface area, but in a really especially advantageous way it becomes lighter in weight, so that the plant based sewage treatment system in accordance with the invention can be installed on an existing building roof. This in turn has the advantage that with the plant based sewage treatment system in accordance with the invention the wastewater can be purified where it arises, namely in the relevant building, on the roof of which the plant based sewage treatment system is installed. This makes it possible to realize an especially inexpensive infrastructure, since for example there is no need for a sewage system with which the wastewater has to be collected from various buildings and intermediately held in a central basin. This solution is also of particular advantage when the building is not connected to a sewage system at all, as can be the case, for example, with remote vacation homes.

The intermediate space could most simply be formed by the plant container or containers being situated at a distance from the building roof. Here the distance between the building roof and plant container could be one or a few centimeters. Basically, the distance or space could be formed by the fact that the plant container is situated resting on or attached to beams, where the beams are situated at a distance from each other on the building roof. In this way the intermediate space is formed by the building roof, the wall of the plant container turned toward the building roof and the beams. Optionally, sealants, for example in the form of expanded foam, can be provided in order to seal the resulting intermediate space from the environment. Wooden beams are preferably used, through which a plant based sewage treatment system in accordance with the invention can be implemented to be light in weight and low in cost in an especially advantageous way.

It would also be conceivable that specifically a plant container would be situated on a structure at a given distance to the building roof. Such a structure could have, for example, spacers or piers, where care is to be taken that the given maximum roof load not be exceeded. In this way the intermediate space could be formed over nearly the entire area of the plant container that is turned toward the building roof.

It is also conceivable that a plant container is situated indirectly or directly on the building roof, but that at least one shaft or several air shafts is/are provided under one or between a number of plant containers, through which the air or exchange medium can be conducted from the building.

The intermediate space could, in accordance with a preferred embodiment, be bounded by a part of the building roof, by a part of the plant container or plant basin facing the building roof and by at least one wall, where a wall is situated or extends between the building roof and plant container or plant basin and is suitable for sealing the intermediate space from the external environment of the building. A wall could be made, for example, of expanded foam, which is clamped in at the outer edge of a plant basin between the plant basin and the building roof. An isolated inlet and/or an outlet for air from the environment into the intermediate space can be provided in order to support, for example, a chimney effect, which will be discussed later.

Plants whose roots have, after special breeding, developed so that they are initially positioned at a specific site in water without substrate and in particular stand there, for example on the bottom of the plant container. If the plant container is provided with a liner, the plants stand directly on this liner and purify the water conducted through the plant container in their root space in symbiosis with the microorganisms living there. Over time deposits can form, but these should not be seen as falling under the term "substrate" in the sense of this invention. The term "substrate" in the sense of this invention is to be understood rather to mean a sediment system with a natural sediment in the sense of Kickuth, for example see ATV Handbook, Biological and Deeper Wastewater Purification [in German], Ernst & Sons, Berlin, 4th Edition, 1997, or is understood to mean an artificially composed sediment of various components. The deposits can be removed from time to time. Suitable plants are developed so that they are matched to the climatic conditions and the wastewater properties. Ideally, they are situated in a suitable sequence in the basins, where the sequence of the plants can be aimed specially at the properties of the water that is to be purified, i.e., the degree of contamination, pH, salt content and/or heavy metal content.

Basically, the building roof could be a flat roof or a peaked roof. A building roof in the form of a flat roof is usually found in industrial building or bungalows, while a building roof in the form of a peaked roof is found in particular in the case of private residences. Accordingly, it is intended for the plant based sewage treatment system in accordance with the invention to be used or employed both in the industrial and in the private field.

Really especially preferably, the air or exchange medium from the building is conducted into an intermediate space at a lower edge of a peaked roof of a building. This could take place, for example, with the help of a blower. With the appropriate intermediate space design, the chimney effect provides that warmer air from the building will rise upward in the intermediate space. If there is a slot or passage connected to the interior of the building provided at the uppermost point of the peaked roof, the cool air can at least partially be conducted back into the building and will then descend in the building. In this way air conditioning provided in the building can be set back in the summer or operated at a lower setting (cost advantage). In the winter the plant based sewage treatment system is heated from below or from the intermediate space by the heated air from the building. In this way the plant based sewage treatment system in accordance with the invention can be operated in the winter at least up to a certain lower outside temperature, since the water that is being purified in the plant container does not freeze.

A plant based sewage treatment system in accordance with the invention could basically have only one plant container. Preferably there are a number of clarification basins, sections or plant containers in which the plants are placed are preferably provided. The plant basins are separated from each other with regard to direct flow of water through them. Thus, a number of plant basins can be situated in an integrated system, for example side by side, where in an especially advantageous way modular construction of the plant based sewage treatment system is possible and plant containers or plant basins can still be matched to given conditions of the building roof in a simple and cheap way. It is also conceivable for a large basin to have dividing walls, for example, which are situated so that in this way individual plant basins or clarification basins are formed or so that they form a given water flow course along which the water that is to be purified flows.

According to an especially preferred embodiment at least two plant containers and/or at least two plant basins are arranged in cascade fashion by each other. These plant containers/basins could have a height difference from one to the next, so that the water that is to be purified can flow from a more highly situated plant basin to a lower basin by itself due to the height difference and the force of gravity, without a water pump, for example, being necessary.

A plant container and/or a plant basin is preferably at least mostly made of a light structural material, for example aluminum. This is also applies to a structure for affixing a plant container to the building roof. In this way the plant based sewage treatment system overall can have a simple construction that can be produced cheaply. For example, an aluminum or wooden structure, which has a low weight because of the choice of material, could be specified for making the plant basin.

This aluminum and/or wood structure could then be provided with a pond liner, so that the structure is leaktight and water does not leak from the plant container onto the roof. Basically, a plant container and/or a plant basin could be sealable with a liner.

Polluted water flows preferably horizontally and/or vertically through the plant based sewage treatment system in accordance with the invention, thus in particular through a plant container and/or a plant basin. For this the corresponding means of connection between individual plant basins and/or water conducting means, for example in the form of areas cut out of the walls in the basins, could be provided. Really especially preferably, the horizontal and/or vertical flow of polluted water here is passive, thus there are not any, or only isolated, electrically operated pumps or paddle wheels to be provided.

According to a really especially preferred embodiment the water that is to be purified falls freely from one plant container and/or plant basin to an adjacent plant container and/or plant basin, in particular at an overflow edge and/or in the form of a waterfall. This serves in particular to introduce oxygen from the environment into the water that is being purified. For example, a number of plant basins could be situated at different heights, so that the water flows just due to gravity from the higher to the lower plant basin. Alternatively, pipe sections in combination with pumps could be provided to pump or transport the water from one plant basin, "over the dividing wall," or directly from the feed unit into the next plant basin, where to realize an artificial waterfall there is a certain free fall stretch over which the water falls into the basin, preferably fanned out, for example over an edge or with a means that is comparable to the spout/watering head of a watering can.

Especially when the plant based sewage treatment system is installed on a flat roof, it could be necessary for the water that is to be purified to be actively conveyable from one plant container and/or plant basin to an adjacent plant container and/or a plant basin, for example by means of a pump. In other words, active transport of the water that is to be purified will be necessary in particular when the plant containers and/or plant basins are essentially situated at the same level.

With the feed unit the water that is to be purified can preferably be delivered to the plant based sewage treatment system at a temperature that essentially corresponds to the room temperature of the building, for example 10 to 30 degrees Celsius. Through this the plant based sewage treatment system in accordance with the invention can be operated in a really especially advantageous way even in winter, since the water does not freeze in winter. The reason for this is that the water that is to be purified is usually introduced into the plant based sewage treatment system, or rooftop plant based sewage treatment system, at room temperature. Also, the fact that the water is to be purified has a flow velocity keeps the water from freezing. The system can operate, for example, at outside temperatures down to 20° C.

In particular, to optimize the clarification effect the water that is to be purified can be transported at a given flow rate through a plant container or basin. This could be realized, for example, through the amount of the water that is admitted into the plant based sewage treatment system per interval of time. In the end the specific flow rate of the water that is being purified is dependent on the specific conditions of the plant based sewage treatment system, especially on the arrangement of the plants in the plant container and on the plant species, but also on the degree of contamination of the water that is being purified. From that point of view a kind of control circuit could be realized in which the flow rate of the water being purified in the plant based sewage treatment system is set as a function of on the degree of purity of the purified water, so that as high as possible a degree of purity can be achieved.

An optimized clarification effect could also be achieved, for example, by being able to conduct the water being purified in different sequences through the plant basin or through the plant containers, so that the clarification effect of the plant based sewage treatment system can be varied. This could be employed in particular when the type of contamination of the water being purified can vary. For example, water that is highly contaminated with heavy metals could be introduced into the plant based sewage treatment system at a point where plants are situated that are chiefly suitable for accumulation or decomposition of heavy metals. From there the water, now reduced in heavy metal concentration, can be sent through the rest of the plant based sewage treatment system. It is also conceivable to omit certain regions/sections of the plant based sewage treatment system, if the plants situated there cannot make any important contribution to the purification of the specific contaminated water that is present. It is also conceivable for the water being purified to be introduced at any point in the plant based sewage treatment system, so that plants situated upstream from the entry point do not contribute to the purification of the water.

Really especially preferably, plants of specific plant species can be situated and/or used in the individual plant basins with respect to the direction of flow of the water being treated, so that the plant based sewage treatment system can be adjusted to a specific clarification effect. Through this essentially a basic configuration of the plant based sewage treatment system is defined, but it can be modified by the measures already described.

Preferably, plants of only one species are provided in a plant container or in a plant basin. Really especially preferably, pure plant species are provided in each plant basin, and therefore a mixed culture of plants does not predominate in any of the plant basins. This can be advantageous in particular with respect to the growth of plants, since a single population of plants grows more or less uniformly. If on the other hand two different plant species are situated in one plant basin, over time, one plant species, because of its faster growth, will crowd out the other plant species, so that in the end the clarification effect of the plant based sewage treatment system can possibly only change disadvantageously.

Means with which the water being purified can be transported and/or with which the level or depth in the individual plant containers or plant basins can be adjusted could be provided between plant containers and/or the plant basins. Specifically, such means could connect to adjacent plant containers together and have an essentially L shaped tube, with the longer segment of the L shaped preferably being essentially horizontally situated. The tube connections could be made rotatable with respect to the long axis of the longer tube section, so that the shorter tube section, depending on its orientation, in the end establishes the water level in the plant basin.

In a really especially preferred embodiment the plant container and/or plant basins and their contents are built and situated so that a given roof load is not exceeded even considering the possible snow load or significant rainfall. Thus, if the plant based sewage treatment system in winter should be snowed over in a strong snow, there is no fear that the roof will cave in under the load of the plant based sewage treatment system.

Plant based sewage treatment systems in accordance with the invention can, assuming an appropriate position on the roof region of the building, serve for climate control in the building in an especially advantageous way. A prerequisite for this can be, in particular, that there must be appropriate control of the plant based sewage treatment system with respect to the amount of flow of the contaminated water and/or there must be a permanently exchanged medium, for example air or gas or a liquid. The construction of the roof could be such that the temperature of the building under the plant based sewage treatment system and the temperature of the plant based sewage treatment system are in permanent exchange with each other. To that extent the plant based sewage treatment system can be used in a really especially advantageous way simultaneously as a climate control system for the building, so that an additional synergistic effect is obtained. Specifically, not only is the wastewater purified, but the building in which the wastewater comes from is also climatized. This can be realized in particular with the help of the exchange medium or air that is passed through the intermediate space. Also, because the plant container is situated on the building roof, the roof is not directly exposed to insolation in summer. Thus, the building does not heat up to the extent that it would if there were no plant based sewage treatment system situated on the building roof.

Really especially preferably, the plant based sewage treatment system in accordance with the invention could have the properties or characteristics described below:

There are various plant basins provided, which are situated, for example side by side and which have, in particular, negligible differences of height or level relative to each other. There are a number of plant basins provided, so that an increase of performance of the plant based sewage treatment system can be achieved by a modular mode of construction.

Plants are provided in each basin. In contrast to DE 196 30 831 A1, there is preferably not an extra inlet or outlet basin with large surface area and without plants, so that with the plant based sewage treatment system in accordance with the invention the inlet and outlet basins can also be used for plant-based clarification or can have only a small space requirement.

Weather data collection can take place with a plant based sewage treatment system in accordance with the invention, for example by detecting the water levels in the individual plant basins of the plant based sewage treatment system, for example by means of floats or similar water level detectors. If the amount of contaminated water introduced into the plant based sewage treatment system and the amount of purified water leaving the plant based sewage treatment system per interval of time are known, it is possible to calculate the degree of evaporation of the water in the plant based sewage treatment system, which in turn allows one to draw conclusions concerning the weather occurring in said time interval.

The plant based sewage treatment system in accordance with the invention can be used both for industrial wastewater and for sanitary wastewater, and an appropriate matching or adjustment of the plant based sewage treatment system can be achieved in particular through the use of certain plant species or through the arrangement of certain plant species in the individual plant basins with respect to the direction of flow of the contaminated water.

Preferably, the water being purified or the contaminated water then flows through the plant basins vertically and/or horizontally. In particular in the case of sanitary water clarification applications the contaminated water is usually carried to the roof by a wastewater pump and flows through the individual plant basins or plant chambers, where it is purified of contaminant particles. To avoid the development of odors, preferably a (small) waterfall is built into the plant based sewage treatment system, which brings about continuous introduction of oxygen from the environment. Really especially preferably, the waterfall is situated between two plant basins and has, for example, a lengthwise overflow edge with a given width, over which the water flows and freely falls at least over a small given distance.

Really especially advantageous is the fact that overall the plant based sewage treatment system in accordance with the invention produces pure oxygen for the environment. All systems with sediments and all clarification systems produce carbon dioxide.

The properties of the plant species that are used are listed briefly below. *C. paniculata* chiefly stores the nutrient phosphate. It stores nutrients from a highly loaded wastewater stream only to release them when the load is lower. *Juncus effesus* and *Juncus inflexus*, which can be situated in an/intermediate holding tank, for example, *Phragmites communis* and *Iris pseudacorus* do a good job of enriching the water with oxygen. Especially in preliminary and holding basins, the properties of *C. paniculata* can be used in order to trap high surge loads and to ensure as high as possible a nutrient stream. In addition, through their large bodies and root carpets they can absorb and evaporate large amounts of water in the summer. The plants used in front of *C. paniculata, Ph. communis, Scirpus lacustris* and *Iris pseudacorus*, are nutrient utilizers.

The residence time of the volume elements [of wastewater] in a plant based sewage treatment system in accordance with the invention can be experimentally determined. Thus, in the case of industrial wastewater the optimum cleaning power of the plants occurs at a flow rate of 1.2 m3/h for a plant based sewage treatment system with an effective surface of about 140 m2. The plant based sewage treatment system is capable of degrading carbon and nitrogen compounds as well as storing phosphates and heavy metals and thus removing them from the water being purified. Usually the plants are cut once or twice a year so that they concentrate their principle functions, or their growth, in the root region. Tests showed that phosphates and heavy metals are only stored in the root region of the plants, but not in the leaves. As far as that goes, the cut leaves of the plants are even compostable and need not be disposed of at high cost, for example as hazardous waste.

The space saving use on the roof is really especially advantageous. The roof installation is chosen because of the lightweight mode of construction and because roofs are generally available.

Basically, the process safety of a plant based sewage treatment system in accordance with the invention can be guaranteed, namely in particular by plants (especially through the choice of particular species), the spatial arrangement of plants in the plant container and by the given minimum surface in square meters per person in case of sanitary wastewater. This is especially important for commercial licensing of such a system, when a petition for certification of compliance with pollution laws is submitted to the department of building regulations and environmental protection.

In addition, it should be expressly noted that the plant based sewage treatment system in accordance with the invention also works at night, thus the plants have nighttime activity without light. In addition, a plant based sewage treatment system on the roof is advantageous in the case of a fire, since the water that is there can serve for fire protection. With the plant based sewage treatment system in accordance with the invention the [amount of] wastewater can be reduced by about 50%, which is brought about firstly by evaporation of the water in the plant based sewage treatment system. With a plant based sewage treatment system in accordance with the invention oxygen is produced in a really especially advantageous way, as already mentioned. From that standpoint this can be utilized for emissions trading, since an industrial concern that has a plant based sewage treatment system in accordance with the invention can emit more CO2 because of this, since the plant based sewage treatment system produces oxygen and can offset the higher CO2 emission. Of course, the plant based sewage treatment system in accordance with the invention first of all serves to reduce the amount of wastewater, so that it represents an opportunity to satisfy the conditions prescribed in the federal emissions control law.

In a really especially advantageous way a reduction of costs of the industrial and/or sanitary wastewater that accumulates can take place through the plant based sewage treatment system in accordance with the invention, since high costs for industrial disposal of the wastewater can be omitted.

Usually, the plants of a plant based sewage treatment system function for at least 20 years, so that after an initial investment, in particular with regard to the purchase of plants, such a system is very rapidly amortized. As a rule, roof repairs also do not arise, since the roof is not exposed to weather, for example sun, hail or snow, because of the plant based sewage treatment system. The fact that green plants are situated on the roof of the building gives people, and especially the workers of an industrial concern, a positive environment, and a sense of well being is associated with this.

BRIEF DESCRIPTION OF THE DRAWINGS

FIG. 6 is a side view of another embodiment of this invention.

DESCRIPTION OF THE PREFERRED EMBODIMENT

Figure 1:
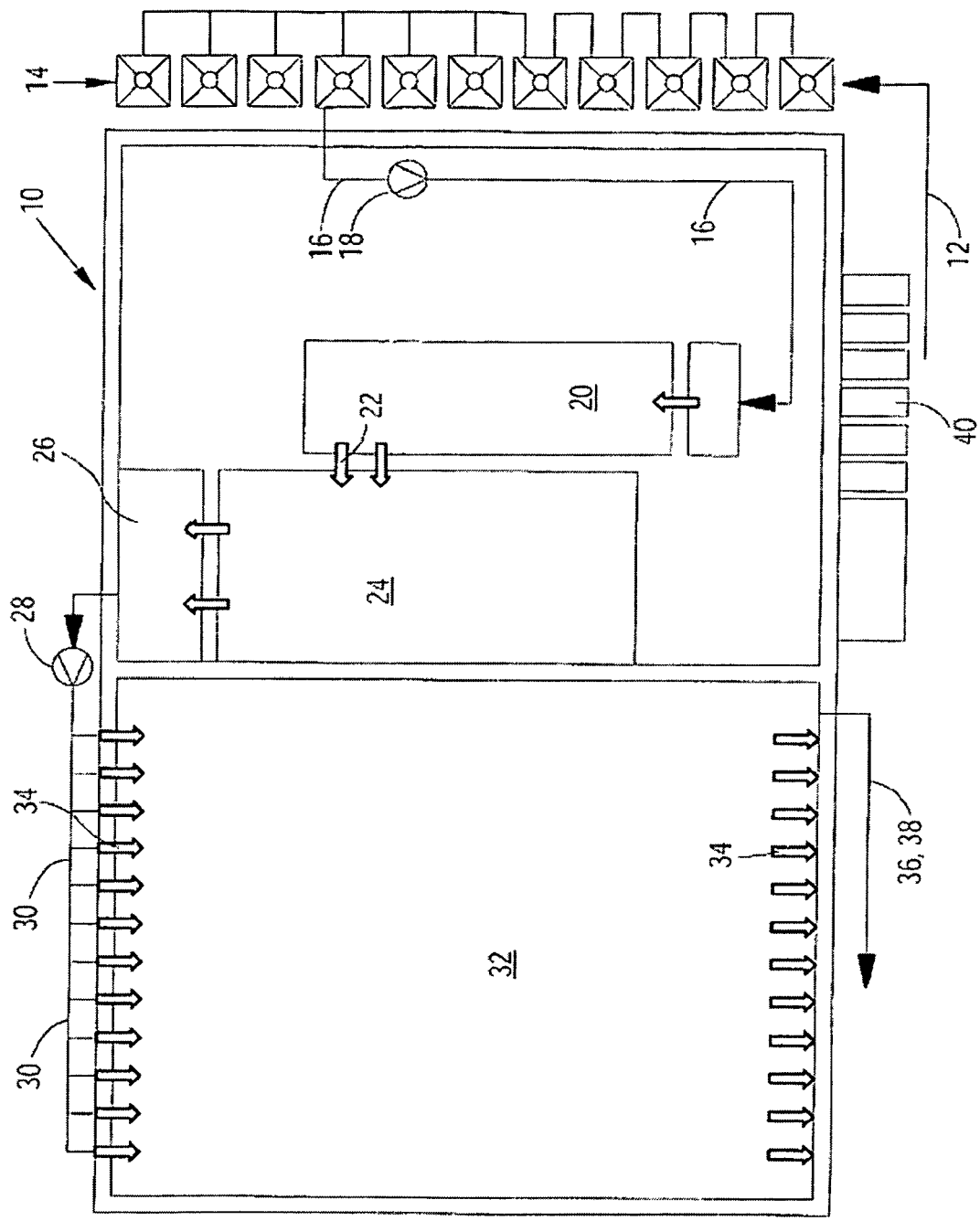
FIG. 1 is a plan view of a first embodiment of a plant based sewage treatment system in accordance with the invention.

FIG. 1 shows a plant based sewage treatment system in accordance with the invention 10 in plan view for a flat roof in an industrial application. The water that is to be purified is supplied to the inlet of the plant based sewage treatment system 10, which is only shown schematically by means of arrow 12. The water that is to be purified is conducted to several decanters 14, which are situated at the same level, for sedimentation. The water being purified is pumped or conducted into preliminary basin 20 via line 16, which is assigned to the feed unit of the plant based sewage treatment system 10, by means of pump 18.

The water being treated falls over waterfall 22, which is only indicated schematically, into the intermediate holding basin 24. The intermediate holding basin 24 is optional here, and serves to balance surges of wastewater, i.e., unexpectedly high amounts of water per interval of time, for example. In other words, the intermediate holding basin 24 is a retention container. From there the water flows to an intermediate basin 26, from which it is sent to main basin 32 via lines 30 by means of pump 28. The water conducted into the main basin 32 flows in the direction of arrows 34 to the outlet 38, which is only schematically indicated. At this point it should be emphasized that a part of the water sent to the plant based sewage treatment system 10 can also evaporate in basins 20, 24 and 32. The basins 20, 24 and 32, which are situated on the building roof, are accessible by means of stairs 40.

Figure 2:
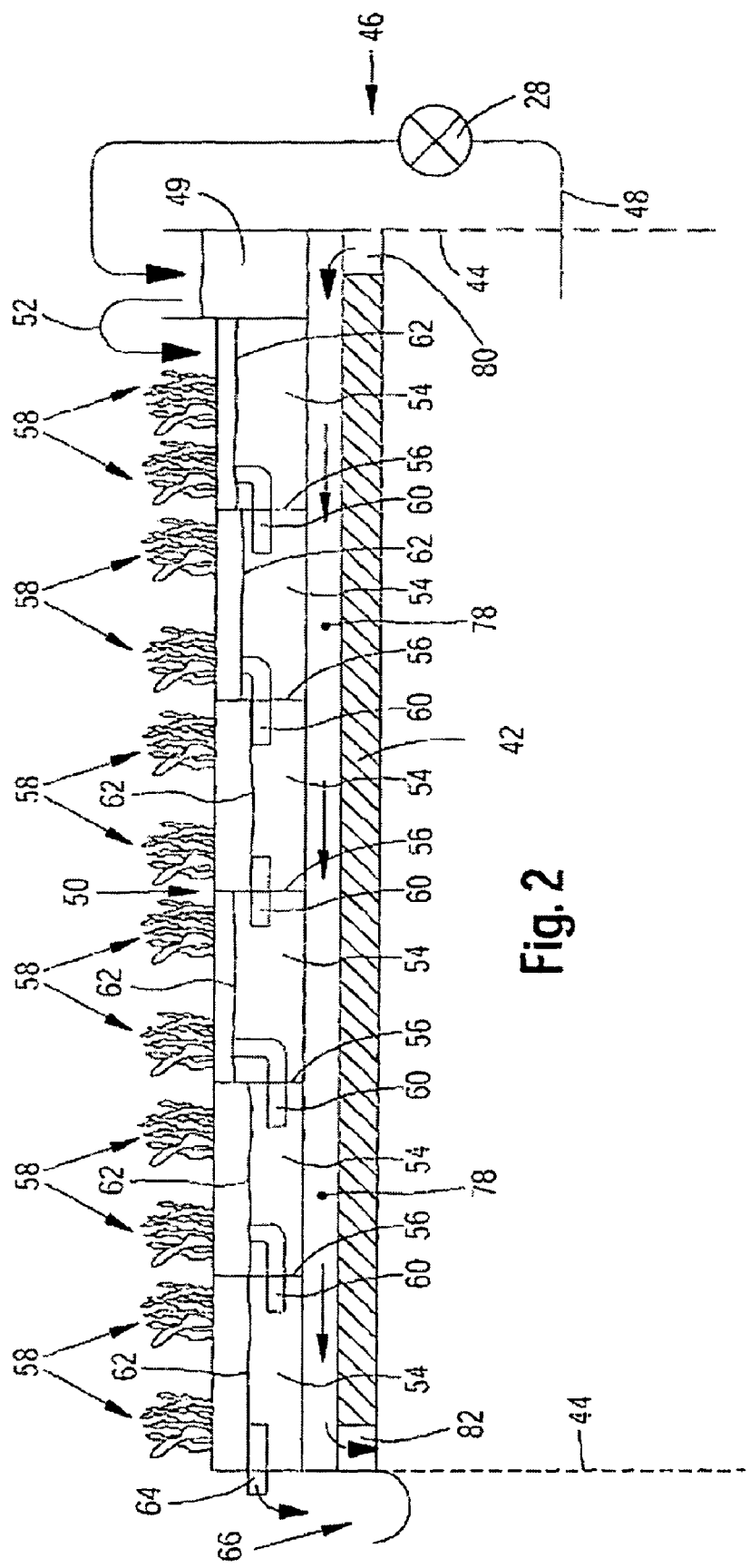
FIG. 2 is a side view of a second embodiment of a plant based sewage treatment system in accordance with the invention.

FIG. 2 shows, in a side view, another embodiment example of a plant based sewage treatment system 10 in accordance with the invention. The plant based sewage treatment system 10 is installed on a roof 42 of a building 44, which is schematically shown by the dashed line. The plant based sewage treatment system 10 in FIG. 2 consists of a feed unit 46, which has lines 48 as well as a pump 28, with which the water that is to be purified can be brought into the fill tank 49. From there the water to be purified is conducted into the plant container 50 of the plant based sewage treatment system 10, which is only schematically indicated by arrow 52. The plant container 50 consists of a total of 6 plant basins 54, which are separated from each other by a dividing wall 56. Plants 58 are situated in each of these plant basins 54. Thus, in each plant basin 54 there is water and, correspondingly, plants 58. The individual plant basins 54 are connected to each other by tube connections 60. The tube connections 60 have an L shape, where the longer segment of the tube 60 is horizontally situated and connects to adjacent plant basins 54 to each other. The shorter tube segment of tube connection 60 can be rotated about the lengthwise direction of the longer tube section and thus can have its open end set at various levels in a plant basin 54. The water level 62 in the individual plant basins 54 is variously adjusted in correspondence with level of the open end of these connections, as is shown schematically in FIG. 2: the right hand plant basin 54 has a high water level 62, while the next basin 54 that is to the left accordingly has a lower water level 62, and the basin that is still further to the left has an even lower water level 62. The direction of flow of the water in FIG. 2 is from the right hand plant basin 54 to the left hand plant basin 54, until the water arrives at the outflow 66 via tube 65. The water level is preferably about 5 to 20 cm.

Figure 3:
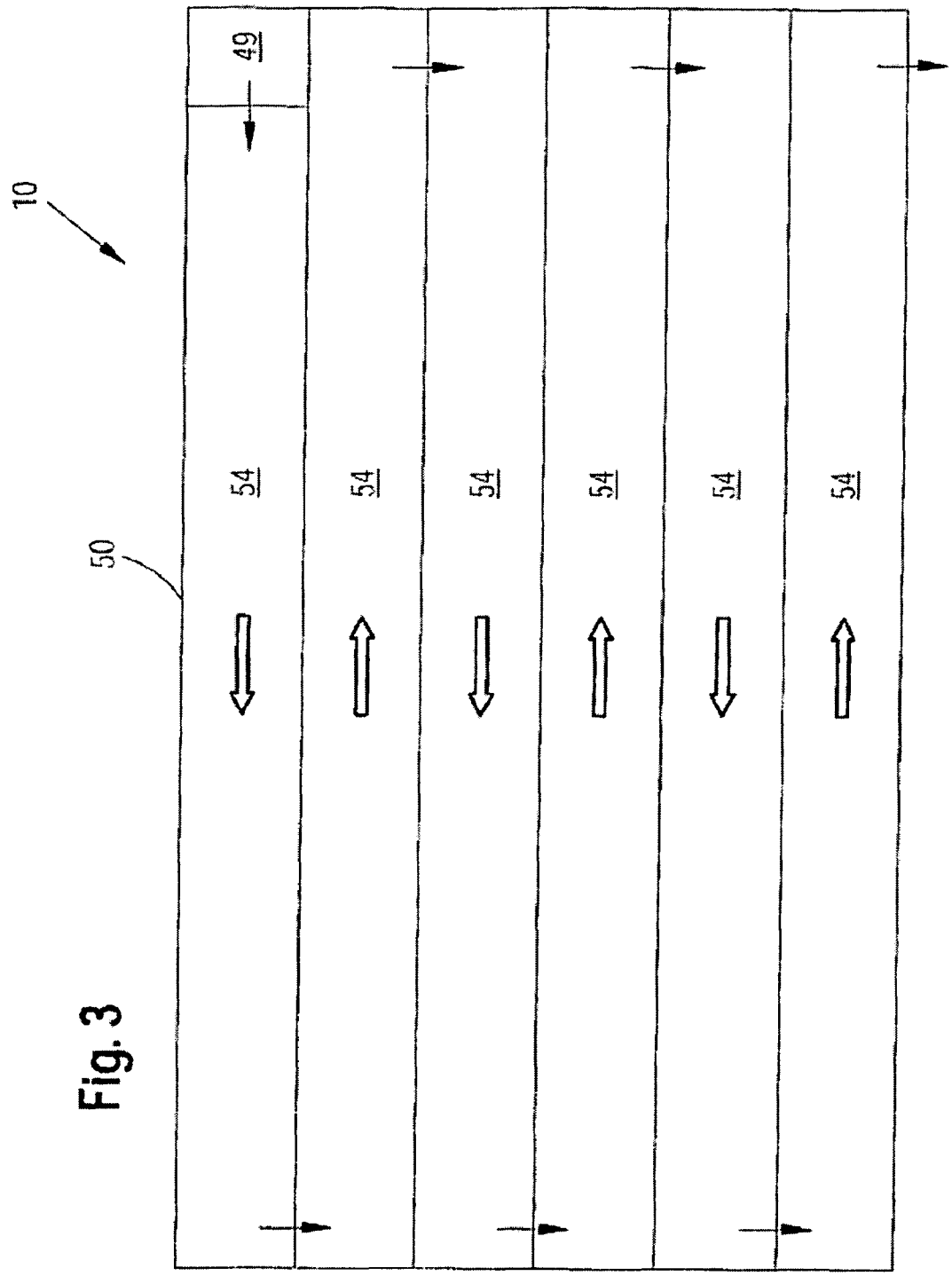
FIG. 3 is a plan view of the embodiment of FIG. 2.

FIG. 3 shows, in a schematic representation, the embodiment example of plant based sewage treatment system 10 from FIG. 2 in plan view. Like or similar structural groups in the figures are designated by the same reference numbers. The direction of flow of the water being purified in the plant container 50 and specifically in the individual plant basins 54 is indicated by individual arrows. Thus, the water being purified is conducted from the fill tank 49 into the first plant basin 54 from right to left, then at the end of the first plant basin 54 it goes into the adjacent plant basin 54. In the second plant basin 54 water flows from left to right. At the end of this plant basin 54 it is then conducted into the next plant basin 54. In other words, the water being purified flows through the plant based sewage treatment system shown in FIG. 3 in a serpentine or meander fashion.

The embodiment example of the plant based sewage treatment system 10 in accordance with the invention that is shown in FIGS. 2 and 3 is especially suitable for the sanitary field. For sanitary applications the water along with fecal matter is first size reduced or chopped with a chopping unit (not shown in the figures), so that a homogeneous solution is present. For the sanitary field about 7 m2 plant area per person is required in the ideal case, although at any rate 5 m2 is sufficient.

Figure 4:
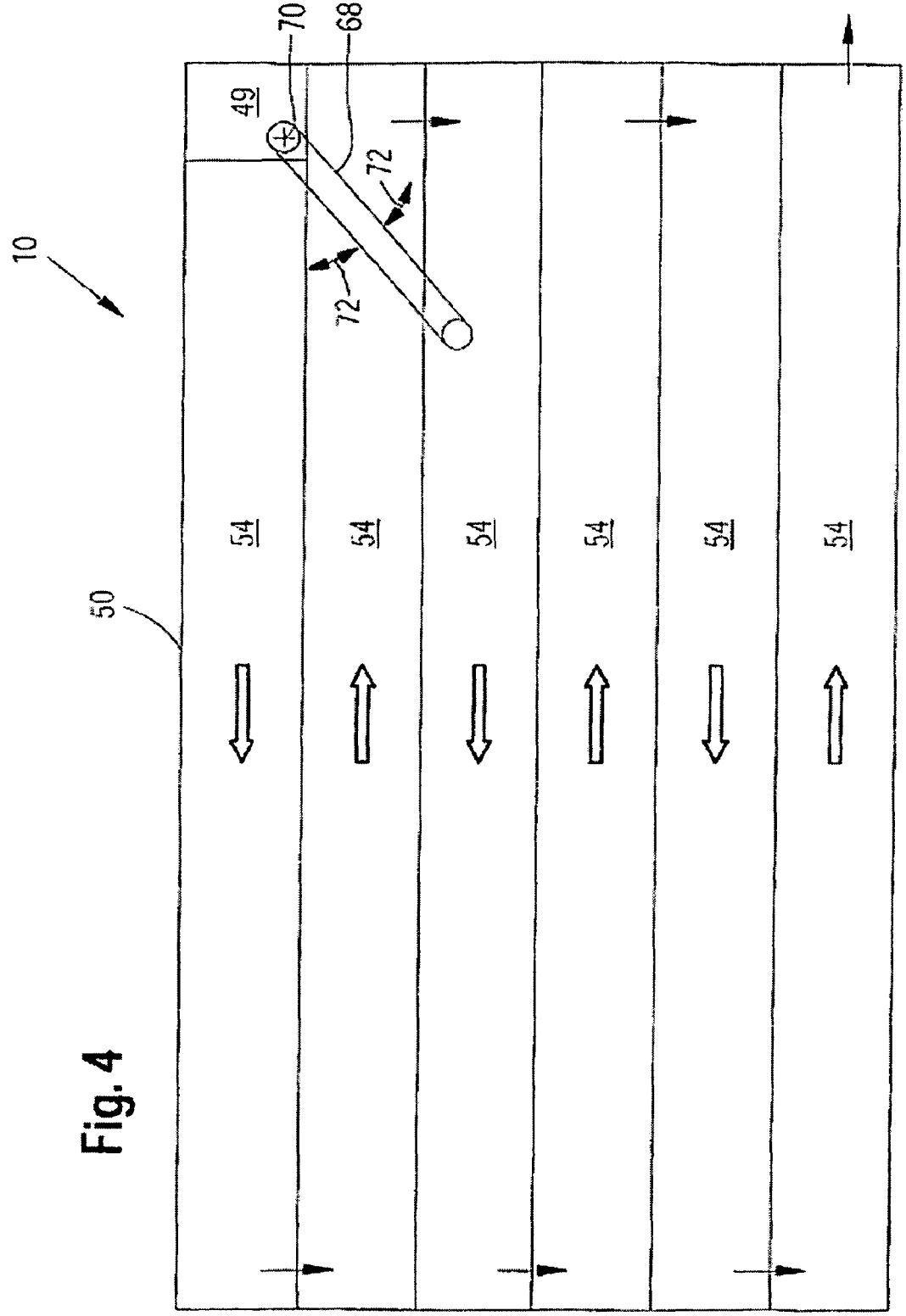
FIG. 4 is a plan view of a third embodiment of a plant based sewage treatment system in accordance with the invention.

FIG. 4 shows, in a schematic representation, another embodiment example of a plant based sewage treatment system 10 in accordance with the invention. Here the basic direction of flow of the wastewater being purified is comparable to that in FIG. 3. However, in the embodiment example in accordance with FIG. 4, means 68, with which the water that is to be purified can be directed to various points in plant container 50 or the plant basins 54 is provided. Means 68 is made in the form of a telescoping tube, and thus its length can change. In addition, means 68 is designed to be rotatable in the direction of arrows 72 about axis 70, which is indicated by a cross, so that the water is to be purified can be introduced basically at any point in plant container 50 with means 68.

As an alternative to the possibility shown in FIG. 4, introducing the wastewater into plant container 50 at various positions by rotating and telescoping the tube, the water could also be conducted with the help of a tube oriented in just one direction, but repositionable perpendicular to this direction, where in this case as well the tube can be adjusted in its length, or is telescoping. Alternatively, several parallel tubes could be provided, which are likewise adjustable in length and through which the water to be purified could be conducted as selected, assuming there are the appropriately controlled switching valves. By introducing the water that is to be purified, in particular for sanitary applications, at different points in the plant container 50 the formation of odors or spatially limited saturation is counteracted.

Figure 5:
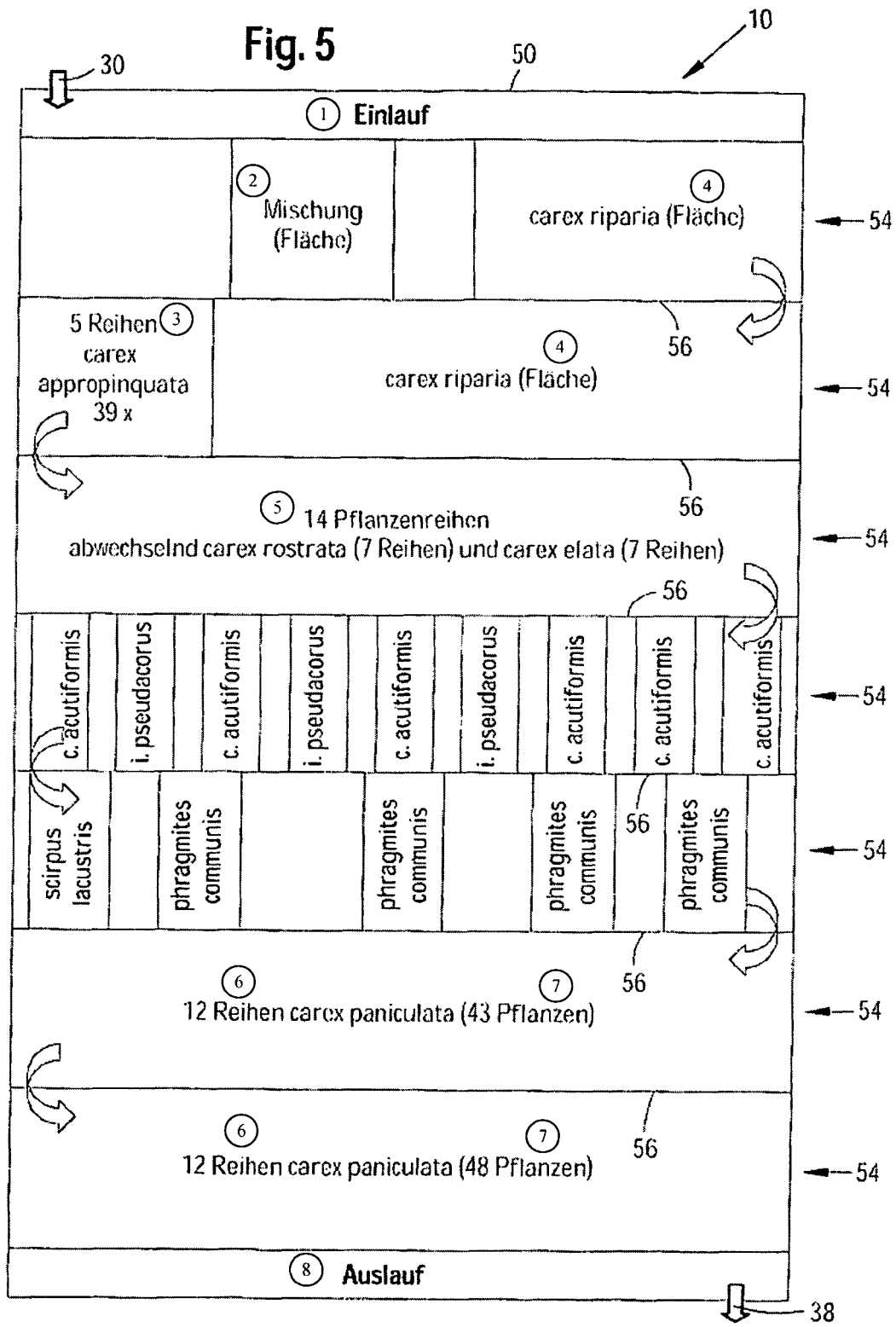
FIG. 5 is a plan view of a fourth embodiment of a plant based sewage treatment system in accordance with the invention.

FIG. 5 shows an embodiment example of a plant based sewage treatment system 10 in accordance with the invention that is optimized for industrial use. Here the water is conducted through the plant container 50 in a manner similar to that shown in Embodiment Example 3. There are a total of seven plant basins 54, each of which extends from the right hand of the plant container 50 to its left hand. The individual areas from which plants of different species are situated are likewise only schematically indicated, where, for example, in the third plant basin 54 from the top two plant species are alternatingly situated, namely *Carex rostrata* and *Carex elata*. In the plant basin 54 below that basin there are a total of nine rows of plants, three each of species *C. acutiformis* and, arranged in the direction of the flow of the water being treated, an additional six rows of plant species, where in this case two plants species are alternatingly situated, beginning with species *Iris pseudacorus*, followed by species *C. acutiformis*, and so forth.

FIG. 6 shows, in a side view, another embodiment example of a plant based sewage treatment system 10 in accordance with the invention. This plant based sewage treatment system 10 is installed on a peaked roof 74. The plant based sewage treatment system 10 in FIG. 6 has a number of plant basins 54, which are laterally offset and installed one under the other and matched to the shape of the peaked roof. Here, too, the water is introduced into the uppermost plant basin with a pump, which is not shown in FIG. 6, and from there, as indicated schematically by arrows 76, it overflows into the next plant basin 54 that is situated under it. In this case a waterfall can also be realized. After the water has flowed through the basins 54 it is withdrawn via drain 66.

As with the flat roof 42 from FIG. 2, an intermediate space 78 between the plant container 50 or the plant basins 54 is provided in a manner in accordance with the invention. An air inlet 80 is provided on the right side, through which air from the building enters and is conducted to the air outlet 82 through the intermediate space 78. In this case heat exchange occurs between the air conducted through the intermediate space 18 and the water in the plant basins 54, so that the air emerging from air outlet 82, which is now cooled, is conducted back into the building 44. This air circulation through the intermediate space 78 is supported or directed by a blower, not shown in FIG. 2. In the same way a plant based sewage treatment system in accordance with the invention could also be installed on the right half of the roof.

Really quite generally, the drain 66 could be a means with which the water is conducted into a drain channel or into a rain barrel or is sent for reuse, for example for flushing a toilet.

In a manner in accordance with the invention an intermediate region 78 is provided between the plant based sewage treatment system 10 and the roof 74 through which an exchange medium or air in building 44 can be conducted. The embodiment example in accordance with FIG. 6 warm air in building 44 rises into the intermediate area 78 in the lower left side 80, goes upward there, as indicated by the arrows in FIG. 6, and returns to the building in the upper central region 82. As the air rises it cools, so that in summer the building 44 can be cooled in an especially advantageous way by the chimney effect through the development of the building 44 in combination with the plant based sewage treatment system 10 in accordance with the invention. In addition, roof 74 building 44 is exposed to a lower solar load due to the plant based sewage treatment system 10. In winter the plant based sewage treatment system 10 can easily be heated by the heated air in building 44, so that the plant based sewage treatment system 10 can also be operated in winter, since the water does not freeze due to the transfer of heat.

The circulation of air through intermediate region 78, i.e., from point 80 to point 82, can easily take place because of the chimney effect, but ventilators or blowers could also be provided to accelerate or increase the air circulation. Also, in the central region 82 a deflector or guide wall, not shown in FIG. 6, could be provided and could be installed, for example, essentially vertically, and could guide the cooled air in a certain direction within building 44.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

The invention claimed is:

1. A plant based sewage treatment system for purifying wastewater with at least one plant container, a feed unit for delivering wastewater to the plant based sewage treatment system, a discharge unit for discharging purified wastewater from the plant based sewage treatment system, with plants arranged in the plant container, where the plants are developed so that they are situated in the plant container without a substrate, where at least a part of the plant container is situated on a building roof, characterized by:
   an intermediate space is formed between the plant container and the building roof, and an exchange medium from the building is conducted through the intermediate space.

2. The plant based sewage treatment system of claim 1, wherein:
   the intermediate space is bounded by a part of the building roof, by a part of the plant container that faces toward the building roof, and by a wall, the wall being between the building roof and the plant container and the wall seals the intermediate space from the external environment.

3. The plant based sewage treatment system of claim 2, wherein:
   an inlet communicates air from the environment into the intermediate space.

4. The plant based sewage treatment system of claim 1, wherein:
   the building roof is a flat roof.

5. The plant based sewage treatment system of claim 1, wherein:
   the building roof is a peaked roof.

6. The plant based sewage treatment system of claim 5, wherein:
   the exchange medium is conducted from the building at a lower edge of the peaked roof into the intermediate space.

7. The plant based sewage treatment system of claim 1, wherein:
   the plant container has at least two plant basins, in each of which plants are introduced and which are separate from each other with respect to a flow of water therethrough.

8. The plant based sewage treatment system of claim 7, wherein:
   the at least two plant basins are situated in cascade fashion at different heights.

9. The plant based sewage treatment system of claim 1, wherein:
   the plant container is made of lightweight construction material.

10. The plant based sewage treatment system of claim 1, wherein:
    the plant container is sealed with a liner.

11. The plant based sewage treatment system of claim 1, wherein:
    the water to be purified flows passively through the plant container.

12. The plant based sewage treatment system of claim 11, wherein:
    the plant container has at least two plant basins, and a connection between the at least two plant basins communicates the water therethrough and through an opening in a wall of the plant basins.

13. The plant based sewage treatment system of claim 1, wherein:
    the plant container has at least two plant basins, and the water to be purified falls freely from one plant basin to the next plant basin at an overflow edge.

14. The plant based sewage treatment system of claim 1, wherein:
    the plant container has at least two plant basins, and the water to be purified is transported from one plant basin to an adjacent plant basin by a pump.

15. The plant based sewage treatment system of claim 1, wherein:

the feed unit delivers the water to be purified at a room temperature of the building.

16. The plant based sewage treatment system of claim 1, wherein:
the water to be purified is transported at a given flow rate through the plant container.

17. The plant based sewage treatment system of claim 1, wherein:
the plant container has a plurality of plant basins, and the water to be purified is conducted in different sequences through the plant basins, so that a clarification effect of the plant based sewage treatment system can be varied.

18. The plant based sewage treatment system of claim 17, wherein:
plants of specific plant species can be situated in individual plant basins with respect to a direction of flow of the water to be purified, so that the clarification effect can be adjusted.

19. The plant based sewage treatment system of claim 1, wherein:
only plants of a single species are provided in a plant container.

20. The plant based sewage treatment system of claim 1, wherein:
the plant container has at least two plant basins; and
an L-shaped tube communicates one plant basin with an adjacent plant basin.

21. The plant based sewage treatment system of claim 1, wherein:
the exchange medium conducted through the intermediate space is used for climatization of the building.

* * * * *